United States Patent
Aoki et al.

(10) Patent No.: US 7,036,310 B2
(45) Date of Patent: May 2, 2006

(54) HYDRAULIC CONTROLLER FOR HYDRAULIC ACTUATOR

(75) Inventors: Takashi Aoki, Saitama (JP); Nobuhiro Kira, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 9 days.

(21) Appl. No.: 10/963,765

(22) Filed: Oct. 14, 2004

(65) Prior Publication Data
US 2005/0143224 A1   Jun. 30, 2005

(30) Foreign Application Priority Data
Oct. 15, 2003 (JP) ............................. 2003-355374
Oct. 4, 2004 (JP) ............................. 2004-290949

(51) Int. Cl.
*B60K 17/356* (2006.01)
*B60L 11/14* (2006.01)

(52) U.S. Cl. ........................................ 60/459; 477/39
(58) Field of Classification Search ................. 60/456, 60/459, 413; 91/46; 477/39, 176, 44, 174
See application file for complete search history.

(56) References Cited

U.S. PATENT DOCUMENTS 6,767,309 B1 * 7/2004 Fujimoto et al. ............. 477/44
6,767,310 B1 * 7/2004 Amanuma et al. .......... 477/174

FOREIGN PATENT DOCUMENTS

JP    2003-54279    2/2003

* cited by examiner

*Primary Examiner*—Thomas E. Lazo
(74) *Attorney, Agent, or Firm*—Arent Fox PLLC

(57) ABSTRACT

A hydraulic controller for a hydraulic actuator (6) incorporated in a power transmission mechanism, wherein an accumulator (16) is connected to an oil supply passage (14) for the hydraulic actuator (6) for supplying oil from a pump (10) via a regulator (11) and a one-way valve (12) and a lubricating oil passage (20) for the power transmission mechanism is connected to the regulator 11 in the drain side thereof, by which energy consumption can be reduced maximally even if the pump (10) is regularly driven for lubrication. It is provided with a hydraulic pressure switching means (19) capable of freely switching a setting pressure of the regulator (11) between a high pressure and a low pressure. While the hydraulic pressure of the oil supply passage (14) is higher than or equal to a pressure at which the hydraulic actuator (6) can be operated, the controller maintains the setting pressure of the regulator (11) at the low pressure to reduce a work load of the pump 10.

9 Claims, 10 Drawing Sheets

HYDRAULIC CONTROLLER FOR HYDRAULIC ACTUATOR

BACKGROUND OF THE INVENTION

1. Field of the Invention

The present invention relates to a hydraulic controller for a hydraulic actuator incorporated into a power transmission mechanism for switching between on and off states of a power transmission.

2. Related Background Art

Conventionally, there has been known a vehicle that uses one of front and rear wheel pairs as main driving wheels driven by a main driving source such as an engine and the other as auxiliary driving wheels driven by an auxiliary driving source such as an electric motor, in order to drive the auxiliary driving wheels when starting on a snowy or punishing road to assist the start and to regenerate power by the electric motor, which is the auxiliary driving source, at deceleration. In this case, a power transmission mechanism, which couples the auxiliary driving source to the auxiliary driving wheels, incorporates a hydraulic actuator such as a hydraulic frictional engaging component (a hydraulic clutch or a hydraulic brake) or the like for switching between on and off states of a power transmission. Thereby, a power loss is prevented from being caused by a reverse drive of the auxiliary driving source by putting the vehicle into the on state of the power transmission only when necessary such as at start or deceleration and putting the vehicle into the off state of the power transmission (disconnecting the auxiliary driving source from the auxiliary driving wheels) under normal conditions.

Conventionally, there has been known a hydraulic controller for the foregoing hydraulic actuator, comprising a hydraulic circuit arranged to supply oil from a hydraulic pump to the hydraulic actuator via a regulator valve, a one-way valve, and a control valve for controlling an operation of the hydraulic actuator, wherein an accumulator capable of accumulating a hydraulic pressure necessary for the operation of the hydraulic actuator is connected to an oil supply passage connecting the one-way valve and the control valve of the hydraulic circuit (Refer to, for example, Japanese Laid-Open Patent Publication (Kokai) No. 2003-54279). In this technology, if the oil supply passage contains oil due to an action of the one-way valve and the hydraulic pressure of the oil supply passage (the hydraulic pressure of the accumulator) is higher than or equal to a predetermined pressure, the hydraulic actuator is operable without driving the hydraulic pump. Therefore, the hydraulic pump is driven only when the hydraulic pressure of the oil supply passage is lower than the predetermined pressure to start accumulation to the accumulator, while the hydraulic pump is stopped under normal conditions to reduce energy consumption caused by driving the pump.

Incidentally, to lubricate the power transmission mechanism by using the hydraulic pump, an oil passage for lubricating the power transmission mechanism is sometimes connected to the regulator valve in the drain side thereof. In this case, to improve the lubricating performance of the power transmission mechanism, it is desired to drive the hydraulic pump regularly to constantly supply the lubricating oil.

In this regard, a load pressure equal to a setting pressure of the regulator valve is applied to the hydraulic pump. In the foregoing conventional example, the setting pressure of the regulator valve is set at a considerably high hydraulic pressure where the accumulator is full. Therefore, to supply the lubricating oil constantly in the conventional example, the hydraulic pump need be regularly driven under the application of the high load pressure. This increases the energy consumption caused by driving the hydraulic pump, thus deteriorating a fuel efficiency.

SUMMARY OF THE INVENTION

In view of the above problem, it is an object of the present invention to provide a hydraulic controller for a hydraulic actuator capable of maximally reducing energy consumption even if a hydraulic pump is regularly driven for lubrication.

To achieve the above object, according to an aspect of the present invention, there is provided a hydraulic controller for a hydraulic actuator incorporated into a power transmission mechanism for switching between on and off states of a power transmission, having a hydraulic circuit arranged to supply oil from a hydraulic pump to the hydraulic actuator via a regulator valve, a one-way valve, and a control valve for controlling an operation of the hydraulic actuator, the hydraulic circuit including an accumulator capable of accumulating a hydraulic pressure necessary for the operation of the hydraulic actuator, the accumulator being connected to an oil supply passage connecting the one-way valve and the control valve, and an oil passage for lubricating the power transmission mechanism connected to the regulator valve in the drain side thereof, the hydraulic controller comprising: hydraulic pressure monitoring means for monitoring a hydraulic pressure of the oil supply passage; hydraulic pressure switching means capable of freely switching a setting pressure of the regulator valve between a low pressure and a high pressure; and control means for controlling the hydraulic switching means so as to switch the setting pressure of the regulator valve between the low pressure and the high pressure according to the hydraulic pressure of the oil supply passage monitored by the hydraulic pressure monitoring means.

According to the above arrangement, while the hydraulic pressure of the oil supply passage is higher than or equal to the pressure enabling the operation of the hydraulic actuator, the control means can maintain the setting pressure of the regulator valve at the low pressure. In this arrangement, preferably the control means switches the setting pressure of the regulator valve to the high pressure when the hydraulic pressure of the oil supply passage is lower than a first predetermined pressure and switches the setting pressure of the regulator valve to the low pressure when the hydraulic pressure of the oil supply passage is higher than or equal to a second predetermined pressure higher than the first predetermined pressure. Accordingly, unless the hydraulic pressure of the oil supply passage is lower than the first predetermined pressure, the setting pressure of the regulator valve is maintained at the low pressure and a load pressure applied to the hydraulic pump becomes low. Therefore, even if the hydraulic pump is regularly driven for lubrication, a workload of the hydraulic pump will not be so high, thereby maximally reducing the energy consumption.

The setting pressure for the high pressure of the regulator valve need be set to a higher pressure than the second predetermined pressure in order to increase the hydraulic pressure of the oil supply passage to a pressure higher than or equal to the second predetermined pressure by supplying oil from the regulator valve. On the other hand, to reduce the energy consumption, the setting pressure for the low pressure of the regulator valve should be set as low as possible. In this regard, there is no problem in that the setting pressure for the low pressure of the regulator valve is lower than the first predetermined pressure. If, however, a second regulator valve is disposed on the lubricating oil passage and a supply pressure of lubricating oil is regulated to be a setting pressure of the second regulator valve, a regulating function of the second regulator valve cannot be achieved unless an input pressure to the second regulator valve is higher than or equal to the setting pressure. Therefore, the setting pressure for the low pressure of the regulator valve is preferably higher than or equal to the setting pressure of the second regulator valve and lower than the first predetermined pressure.

If the hydraulic pressure of the oil supply passage is lower than an accumulation start pressure where the accumulator starts the accumulation, there is a possibility of a rapid decrease in the hydraulic pressure of the hydraulic actuator. If so, by setting the first predetermined pressure higher than or equal to the accumulation start pressure, the setting pressure of the regulator valve is switched to the high pressure before the hydraulic pressure of the oil supply passage becomes lower than the accumulation start pressure. Consequently, the hydraulic pressure of the oil supply passage increases due to an oil supply from the regulator valve, thereby preventing an occurrence of the rapid decrease in the hydraulic pressure of the hydraulic actuator. If the hydraulic actuator comprises a hydraulic frictional engaging component such as a hydraulic clutch or a hydraulic brake and the accumulation start pressure is set lower than the lower limit pressure of the hydraulic pressure, which can secure a required torque transmission capacity of the hydraulic frictional engaging component (a torque transmission capacity necessary for transmitting an input torque to the power transmission mechanism), it is preferable to set the first predetermined pressure higher than or equal to the lower limit pressure in order to secure the reliability of the torque transmission of the hydraulic frictional engaging component.

If the hydraulic pressure monitoring means is arranged to detect that the hydraulic pressure of the oil supply passage becomes lower than the first predetermined pressure and to detect that the hydraulic pressure of the oil supply passage becomes higher than or equal to the second predetermined pressure, it is possible to determine the timing of switching the setting pressure of the regulator valve from the high pressure to the low pressure in line with the time when the hydraulic pressure monitoring means detects that the hydraulic pressure of the oil supply passage becomes higher than or equal to the second predetermined pressure. On the other hand, if the hydraulic pressure monitoring means is arranged to detect only whether or not the hydraulic pressure of the oil supply passage becomes lower than the first predetermined pressure for cost reduction (for example, if the hydraulic pressure monitoring means is a single hydraulic switch), the hydraulic pressure monitoring means cannot determine the timing of switching the setting pressure of the regulator valve from the high pressure to the low pressure. If so, the control means maintains the setting pressure of the regulator valve at the high pressure for a predetermined period of time set in line with the period of time necessary for increasing the hydraulic pressure of the oil supply passage so as to be higher than or equal to the second predetermined pressure when the hydraulic pressure monitoring means detects that the hydraulic pressure of the oil supply passage becomes lower than the first predetermined pressure. After an elapse of the predetermined period of time, the setting pressure of the regulator valve is switched to the low pressure. If the hydraulic pump is actuated in the condition where the hydraulic pressure monitoring means has detected that the hydraulic pressure of the oil supply passage is lower than the first predetermined pressure, the control means maintains the setting pressure of the regulator valve at the high pressure until the hydraulic pressure of the oil supply passage increases to the first predetermined pressure and since then is elapsed a predetermined period of time, which is set in line with a period of time necessary for increasing the hydraulic pressure of the oil supply passage to the second predetermined pressure or higher.

If the hydraulic actuator comprises a hydraulic frictional engaging component such as a hydraulic clutch or a hydraulic brake and a magnitude of the input torque to the power transmission mechanism varies, the hydraulic pressure fractional engaging component need be capable of reliably transmitting the torque at the maximum input torque. Therefore, it is conceivable that the first predetermined pressure is set relatively high in line with the hydraulic pressure necessary for securing the torque transmission capacity corresponding to the maximum value of the input torque. This, however, causes the setting pressure of the regulator valve to be switched to the high pressure in a stage where the hydraulic pressure of the oil supply passage keeps an enough value to secure the torque transmission capacity corresponding to the input torque during normal operation in which the input torque is relatively low. In other words, the frequency in switching the setting pressure of the regulator valve to the high pressure becomes excessively high during normal operation, thus hindering the reduction in the energy consumption caused by driving the hydraulic pump.

On the other hand, with an arrangement in which the first predetermined pressure varies with the input torque, the first predetermined pressure is set relatively low during normal operation in which the input torque is relatively low. Therefore, it is possible to prevent the excessive increase in the frequency in switching the setting pressure of the regulator valve to the high pressure during normal operation. Thus, it is advantageous to reduce the energy consumption caused by driving the hydraulic pump.

To increase the time for maintaining the setting pressure of the regulator valve at the low pressure, namely, the period of time during which the hydraulic pressure of the oil supply passage is kept to be higher than or equal to the first predetermined pressure as much as possible, it is necessary to make the best use of the accumulation capacity of the accumulator. In this case, if the second predetermined pressure is preset higher than or equal to an accumulation end pressure at which the accumulator is full, the accumulator is filled with an oil pressure, thereby making the best use of the accumulation capacity of the accumulator.

DETAILED DESCRIPTION OF THE PREFERRED EMBODIMENTS

Figure 1:
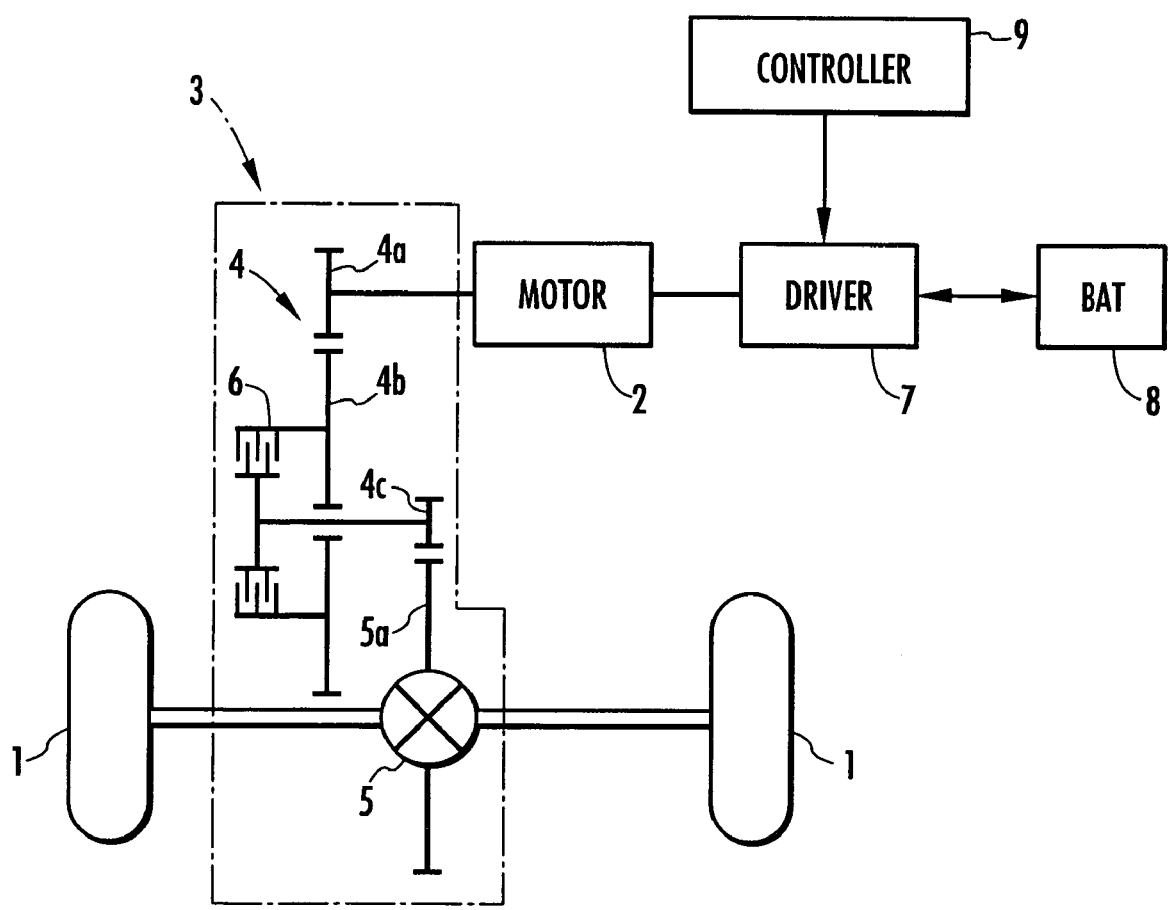
FIG. 1 is a skeleton diagram showing an example of a power transmission mechanism including a hydraulic actuator to be controlled in the present invention.

Referring to FIG. 1, there is shown an auxiliary driving wheel 1 of a vehicle driven by an electric motor 2, which is an auxiliary driving source, via a power transmission mechanism 3. The auxiliary driving wheel 1 is one of a front wheel and a rear wheel. The other wheel is driven by a main driving source such as an engine, though not shown.

The power transmission mechanism 3 comprises a deceleration mechanism 4 for inputting power from the electric motor 2 and a differential gear 5 for distributing power output from the deceleration mechanism 4 to right and left auxiliary driving wheels 1, 1. The deceleration mechanism 4 comprises a reduction gear string composed of a first gear 4a fixed to an output shaft of the electric motor 2, a second gear 4b engaging with the first gear 4a, and a third gear 4c engaging with an input gear 5a of the differential gear 5. A hydraulic clutch 6 as a hydraulic actuator is disposed between the second gear 4b and the third gear 4c. With an engagement of the hydraulic clutch 6, the second gear 4b is coupled to the third gear 4c, thereby enabling power transmission via the power transmission mechanism 3. With a release of the hydraulic clutch 6, the coupling between the second gear 4b and the third gear 4c is disengaged, thereby shutting off the power transmission via the power transmission mechanism 3.

The electric motor 2 is connected to an in-vehicle battery 8 via a motor driver circuit 7. A controller 9 composed of a computer controls the motor driver circuit 7. It performs a start assist control of driving the auxiliary driving wheels 1 by the electric motor 2 at start on a snowy or punishing road and performs a regeneration control of charging the in-vehicle battery 8 by generating electricity using the electric motor 2 at decelerating the vehicle. When performing the start assist control or the regeneration control, the power transmission mechanism 3 is put in a power transmittable state by engaging the hydraulic clutch 6. Under normal conditions, the hydraulic clutch 6 is released to put the power transmission mechanism 3 in a state where the power transmission is interrupted. Thus, it prevents deterioration in endurance of the electric motor 2 or an occurrence of a power loss caused by reverse driving of the electric motor 2 made by the auxiliary driving wheels 1.

Figure 2:
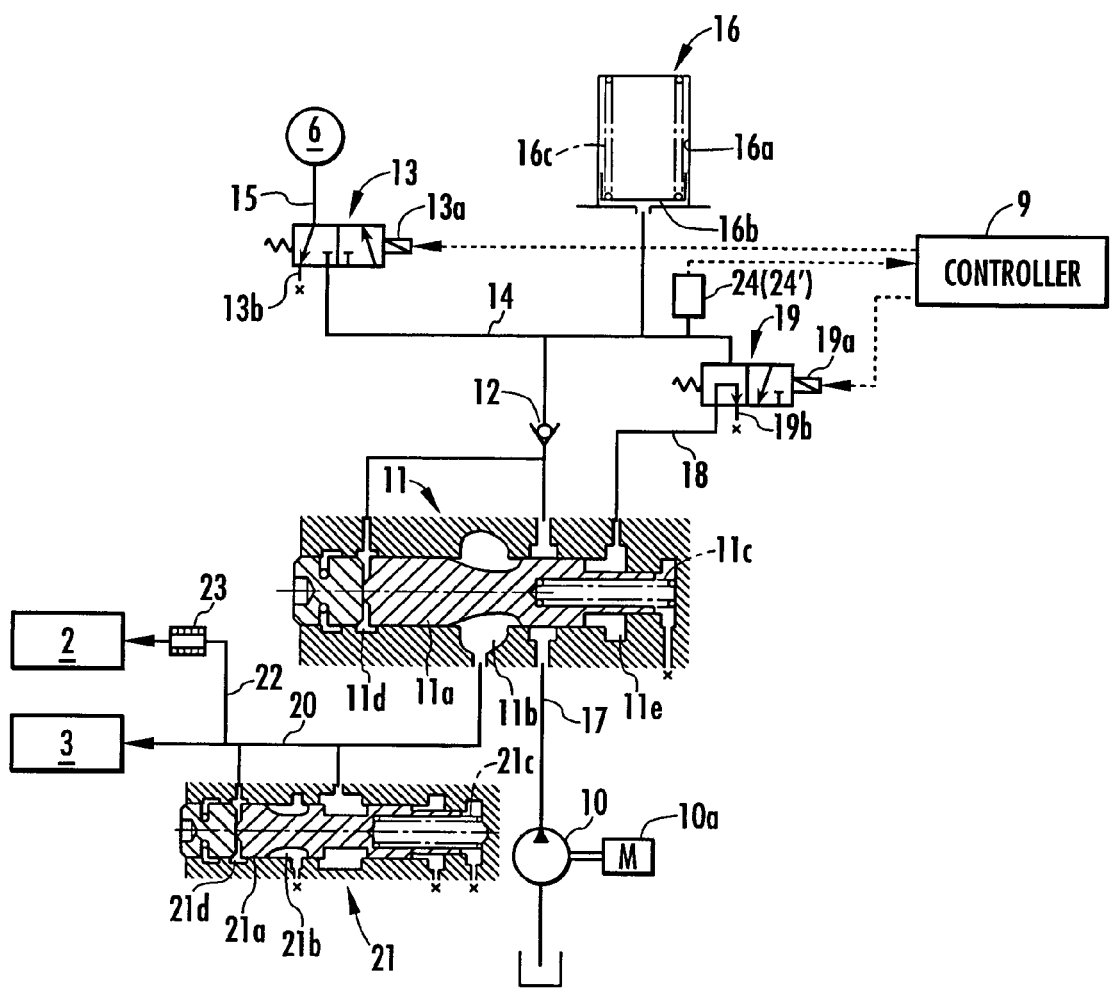
FIG. 2 is a diagram showing a hydraulic circuit for a hydraulic actuator according to a first embodiment of the present invention.

A hydraulic circuit shown in FIG. 2 controls the hydraulic clutch 6. The hydraulic circuit is arranged to supply the hydraulic clutch 6 with oil ejected from an electric hydraulic pump 10 driven by a motor 10a via a regulator valve 11, a one-way valve 12, and a control valve 13. The control valve 13 is an electromagnetic three-way valve controlled by the controller 9. An oil supply passage 14 connecting the control valve 13 to the one-way valve 12 is connected to a clutch oil passage 15 leading to the hydraulic clutch 6 at energizing a solenoid 13a of the control valve 13. Consequently, the hydraulic clutch 6 is lubricated and then engaged. When the energization of the solenoid 13a is terminated, the oil supply passage 14 is disconnected from the clutch oil passage 15 and the clutch oil passage 15 is connected to a drain port 13b. As a result, oil is discharged from the hydraulic clutch 6, thereby releasing the hydraulic clutch 6.

Figure 3:
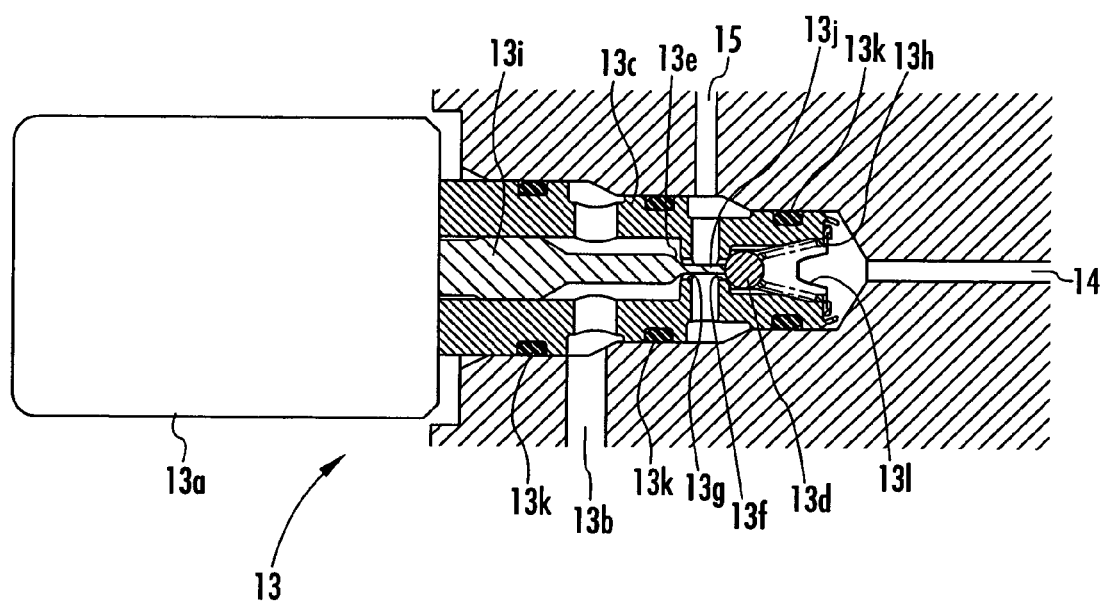
FIG. 3 is a cross sectional view showing a concrete structure of a control valve disposed in the hydraulic circuit shown in FIG. 2.

Although the control valve 13 can also be composed of a spool valve, it is susceptible to oil leakage. Therefore, in this embodiment, the control valve 13 is a ball poppet valve as shown in FIG. 3. Specifically, the control valve 13 is provided with a ball 13d and a poppet 13e housed in a solenoid body 13c fixed to the solenoid 13a. In the solenoid body 13c, there are formed a first valve hole 13f bringing the oil supply passage 14 into communication with the clutch oil passage 15 and a second valve hole 13g bringing the clutch oil passage 15 into communication with the drain port 13b. The ball 13d functions as a valve for opening and closing the first valve hole 13f, being biased by a spring 13h toward the closed side leftward in FIG. 3 for closing the first valve hole 13f. The poppet 13e functions as a valve for opening and closing the second valve hole 13g, being integrated with a plunger 13i moved so as to apply pressure rightward in FIG. 3 when energizing the solenoid 13a. Furthermore, the poppet 13e is provided with a pin 13j in a protruding condition contacted against the ball 13d through the valve holes 13e, 13f. When the energization of the solenoid 13a is terminated, the ball 13d biased by the spring 13h closes the first valve hole 13f and the poppet 13e is pushed leftward in FIG. 3 through the ball 13d and the pin 13j due to the bias of the spring 13h, thereby opening the second valve hole 13g. When the solenoid 13a is energized, the poppet 13e moves rightward in FIG. 3 to close the second valve hole 13g and the ball 13d is pushed rightward through the pin 13j, thereby opening the first valve hole 13f. When the solenoid 13a is not energized, the first valve hole 13f is favorably sealed by the ball 13d. When the solenoid 13a is energized, the second valve hole 13g is favorably sealed by the poppet 13e. Therefore, oil leakage from these valve holes 13f and 13e can be prevented maximally. In addition, an O-ring 13k is attached to the periphery of the solenoid body 13c. Therefore, oil leakage from the periphery of the solenoid body 13c is prevented, too. Furthermore, an oil filter 13l is attached to an end of the solenoid body 13c in the side of the oil supply passage 14.

The oil supply passage 14 is connected to an accumulator 16. The accumulator 16 comprises a piston 16b housed in an accumulator chamber 16a in communication with the oil supply passage 14 and a spring 16c for applying a back pressure to the piston 16b. Hydraulic pressure of the oil supply passage 14 moves the piston 16b backward against the bias of the spring 16c and thereby the accumulator chamber 16a accumulates oil. Note here that an O-ring not shown is attached to the periphery of the piston 16b to prevent oil leakage from the accumulator 16.

Figure 4:
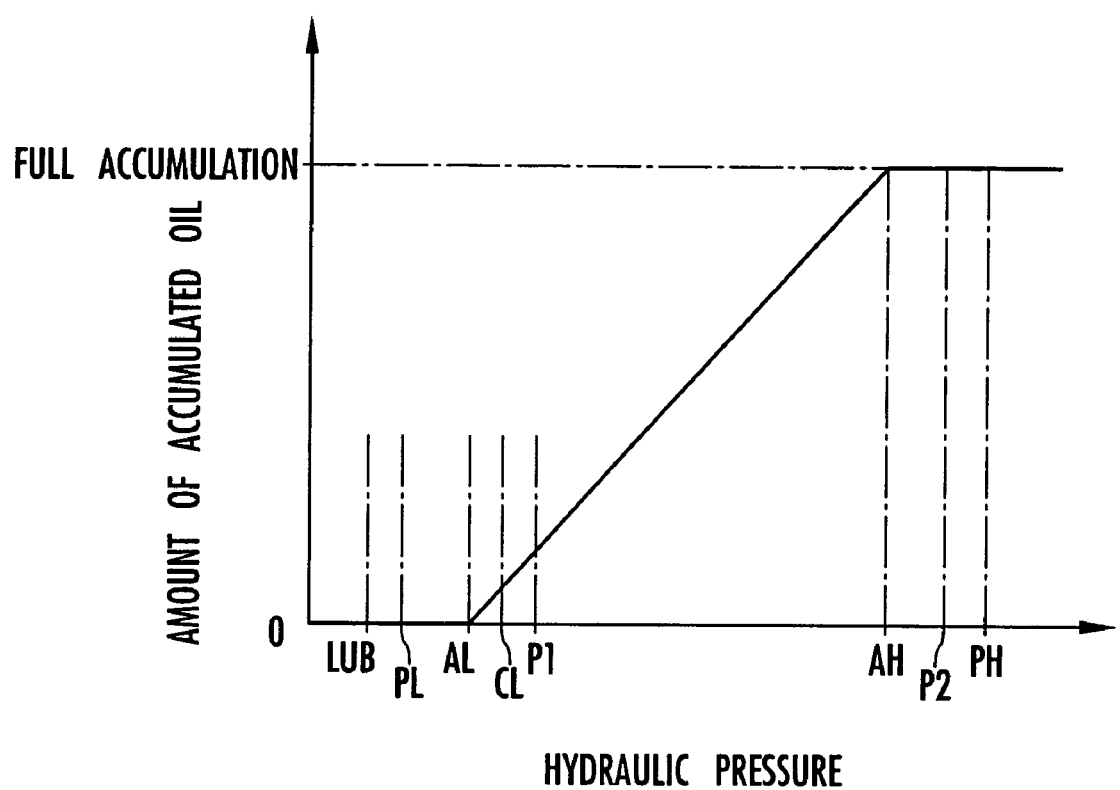
FIG. 4 is a graph showing a relation between a hydraulic pressure of an oil supply passage and an amount of accumulated oil in an accumulator and various hydraulic pressure values for use in a hydraulic pressure switching control shown in FIG. 5.

The amount of oil accumulated in the accumulator 16 varies as shown in FIG. 4 according to a hydraulic pressure of the oil supply passage 14. In FIG. 4, AL indicates an accumulation start pressure corresponding to an initial bias of the spring 16c and AH indicates an accumulation end pressure corresponding to a bias of the spring 16c obtained when the piston 16b reaches a backward stroke end and the accumulator 16 becomes full. During the period until the hydraulic pressure of the oil supply passage 14 increases from the accumulation start pressure AL to the accumulation end pressure AH, an amount of accumulated oil in the accumulator 16 increases in proportion to the hydraulic pressure of the oil supply passage 14. The accumulation start pressure AL is preset to a pressure near the lower limit pressure CL of the hydraulic pressure that secures a required torque transmission capacity of the hydraulic clutch 6 (a torque transmission capacity necessary for transmitting an output torque of the electric motor 2, which is an input torque to the power transmission mechanism 3). While the accumulation start pressure AL is set lower than the lower limit pressure CL in this diagram, the accumulation start pressure AL can be set higher than the lower limit pressure CL. The electric motor 2 is controlled so as to be constant in the output torque.

The regulator valve 11 functions to regulate the hydraulic pressure of the pump oil passage 17 connecting the hydraulic pump 10 to the one-way valve 12 at the predetermined setting pressure and is provided with a spool 11a for providing communication between the pump oil passage 17 and the drain port 11b or interrupting the communication. The spool 11a is biased by the spring 11c toward the non-drain side, namely leftward in FIG. 2, to disconnect the pump oil passage 17 from the drain port 11b and is pressed toward the drain side on the right hand to bring the pump oil passage 17 into communication with the drain port 11b by the hydraulic pressure of the pump oil passage 17 input to an oil chamber 11d at the left end.

The regulator valve 11 is further provided with an oil chamber 11e at the right end for pressing the spool 11a toward the non-drain side. A pilot oil passage 18 leading to the oil chamber 11e is connectable to the oil supply passage 14 via a switching valve 19, which is a hydraulic pressure switching means. The switching valve 19 comprises an electromagnetic three-way valve controlled by the controller 9. When a solenoid 19a of the switching valve 19 is energized, the oil supply passage 14 is connected to the pilot oil passage 18, thereby inputting the hydraulic pressure of the oil supply passage 14 into the oil chamber 11e. When the energization of the solenoid 19a is terminated, the oil supply passage 14 is disconnected from the pilot oil passage 19, thereby connecting the pilot oil passage 19 to a drain port 19b and opening the oil chamber 11e to the atmosphere. In this regard, assuming that P, F, s1, and s2 are the hydraulic pressure of the pump oil passage 17 and the oil supply passage 14, the bias of the spring 11c, a pressure receiving area of the spool 11a facing the oil chamber 11d, and a pressure receiving area of the spool 11a facing the oil chamber 11e (s2<s1), respectively, an equation "P×s1=F" is satisfied in the condition where the oil chamber 11e is opened to the atmosphere, and an equation "P×s1=F+P×s2" is satisfied in the condition where the hydraulic pressure of the oil supply passage 14 is input to the oil chamber 11e. Therefore, the setting pressure of the regulator valve 11 is a relatively low setting pressure PL (=F/s1) in the condition where the oil chamber 11e is opened to the atmosphere and is a relatively high setting pressure PH (=F/s (s1−s2)) in the condition where the hydraulic pressure of the oil supply passage 14 is input to the oil chamber 11e. Note here that the switching valve 19 is a ball poppet valve similarly to the foregoing control valve 13 so as to prevent oil leakage from the switching valve 19 maximally.

The drain port 11b of the regulator valve 11 is connected to a lubricating oil passage 20 for supplying lubricating oil to lubricated places such as the differential gear 5 disposed in the power transmission mechanism 3 and bearing portions of the gears 4a, 4b, and 4c. The lubricating oil passage 20 is provided with a second regulator valve 21 for regulating the supply pressure of the lubricating oil. The regulator valve 21 has a spool 21a for bringing the lubricating oil passage 20 into communication with a drain port 21b and interrupting the communication. The spool 21a is biased by a spring 21c toward the non-drain side, namely leftward in FIG. 2, to disconnect the lubricating oil passage 20 from the drain port 21b and is pressed toward the drain side on the right hand to bring the lubricating oil passage 20 into communication with the drain port 21b by the hydraulic pressure of the lubricating oil passage 20 input to an oil chamber 21d at the left end. Then, a setting pressure LUB of the second regulator valve 21 becomes F/s (LUB=F/s) where F is the bias of the spring 21c and s is a pressure receiving area of the spool 21a facing the oil chamber 21d. Note here that the setting pressure LUB is set lower than the foregoing accumulation start pressure AL as shown in FIG. 4. A cooling oil passage 22 of the electric motor 2 branches off from the lubricating oil passage 20. Furthermore, an oil cooler 23 is provided on the cooling oil passage 22 to cool down the electric motor 2 by the oil supplied via the cooling oil passage 22.

In this regard, the differential gear 5 and the third gear 4c of the power transmission mechanism 3 are continuously rotating while the vehicle is moving. Therefore, it is necessary to drive the hydraulic pump 10 regularly so as to constantly lubricate the bearing portions of the differential gear 5 and the third gear 4c. In this condition, to reduce the energy consumption caused by driving the hydraulic pump 10, it is necessary to decrease the setting pressure of the regulator valve 11 to reduce the workload of the hydraulic pump 10. If the accumulator 16 contains an oil pressure to some extent, the one-way valve 12 blocks an oil flow toward the side of the regulator valve 11 at switching the setting pressure of the regulator valve 11 to the low pressure. Therefore, the oil pressure accumulated in the accumulator 16 can engage the hydraulic clutch 6. Note that, however, the oil of the hydraulic clutch 6 is discharged from the drain port 13b of the control valve 13 at releasing the hydraulic clutch 6. Therefore, a repetition of the engagement and release of the hydraulic clutch 6 causes an oil consumption of the oil supply passage 14 and oil is pushed out of the accumulator 16 for that. The amount of accumulated oil in the accumulator 16 thus gradually decreases, thereby decreasing the hydraulic pressure of the oil supply passage 14. If the hydraulic pressure of the oil supply passage 14 decreases lower than the above lower limit pressure CL, the torque transmission capacity of the hydraulic clutch 6 is insufficient for the input torque to the power transmission mechanism 3, thereby causing a slip of the hydraulic clutch 6 and inhibiting a satisfactory torque transmission. Therefore, it is necessary to switch the setting pressure of the regulator valve 11 to the high pressure to increase the hydraulic pressure of the oil supply passage 14 by an oil supply from the regulator valve 11.

Therefore, in this embodiment, decision values on the hydraulic pressure of the oil supply passage 14 are provided as a first predetermined pressure P1 set slightly higher than the foregoing lower limit pressure CL and a second predetermined pressure P2 set slightly higher than the foregoing accumulation end pressure AH as shown in FIG. 4. If the hydraulic pressure of the oil supply passage 14 becomes lower than the first predetermined pressure P1, the hydraulic pressure of the oil supply passage 14 is input to the oil chamber 11e of the regulator valve 11 by the switching valve 19 for switching to a high pressure mode where the setting pressure of the regulator valve 11 is set to the high pressure PH. If the hydraulic pressure of the oil supply passage 14 becomes higher than or equal to the second predetermined pressure P2, the oil chamber 11e of the regulator valve 11 is opened to the atmosphere by the switching valve 19 for switching to a low pressure mode where the setting pressure of the regulator valve 11 is set to the low pressure PL. If the hydraulic pressure of the oil supply passage 14 becomes lower than the accumulation start pressure AL, there is a possibility of a rapid decrease in the hydraulic pressure of the hydraulic clutch 6. Therefore, if the accumulation start pressure AL is set higher than the lower limit pressure CL, the first predetermined pressure P1 is set slightly higher than the accumulation start pressure AL.

In this regard, to increase the hydraulic pressure of the oil supply passage 14 to the second predetermined pressure P2 by an oil supply from the regulator valve 11, the setting pressure PH for the high pressure of the regulator valve 11 need be higher than the second predetermined pressure P2. On the other hand, the setting pressure PL for the low pressure can be lower than the first predetermined pressure P1 without any problem. To secure the regulating function of the second regulator valve 21, however, the setting pressure PL for the low pressure of the regulator valve 11 need be higher than the setting pressure LUB of the second regulator valve 21. Therefore, the setting pressure PL for the low pressure is set slightly higher than the setting pressure LUB of the second regulator valve 21 in consideration of a variation of the hydraulic pressure, so that the load on the hydraulic pump 10 can be reduced as much as possible.

Figure 5:
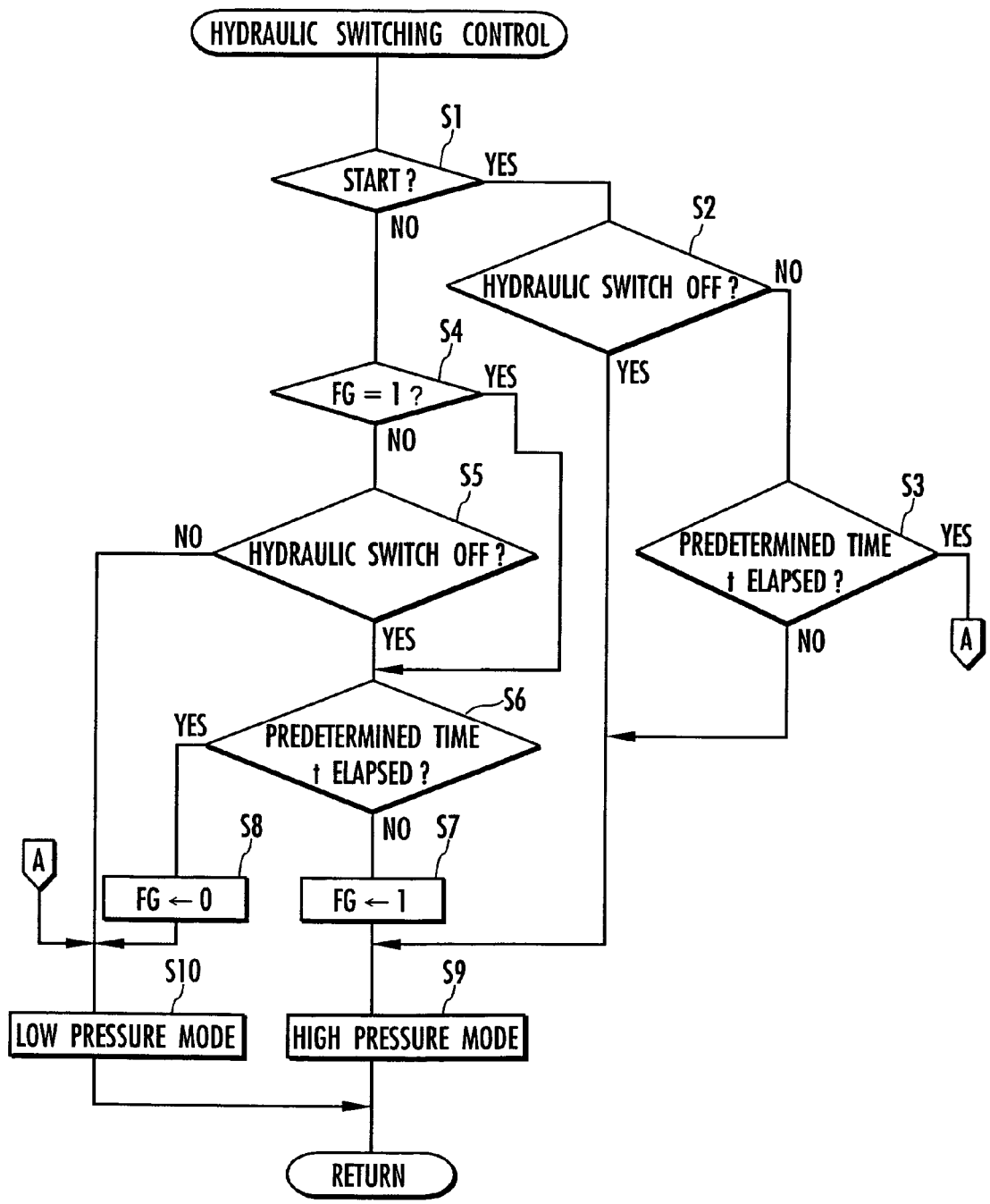
FIG. 5 is a flowchart showing a program of the hydraulic pressure switching control according to the first embodiment of the present invention.

The following describes switching controls of the controller 9, which is a control means, in the high pressure mode and the low pressure mode in detail with reference to FIG. 5. Note that the controller 9 receives an input of a signal from a hydraulic switch 24, which is a hydraulic pressure monitoring means, disposed on the oil supply passage 14. The hydraulic switch 24 is turned on when the hydraulic pressure of the oil supply passage 14 is higher than or equal to the first predetermined pressure P1 and turned off when the hydraulic pressure of the oil supply passage 14 is lower than the first predetermined pressure P1.

Figure 6:
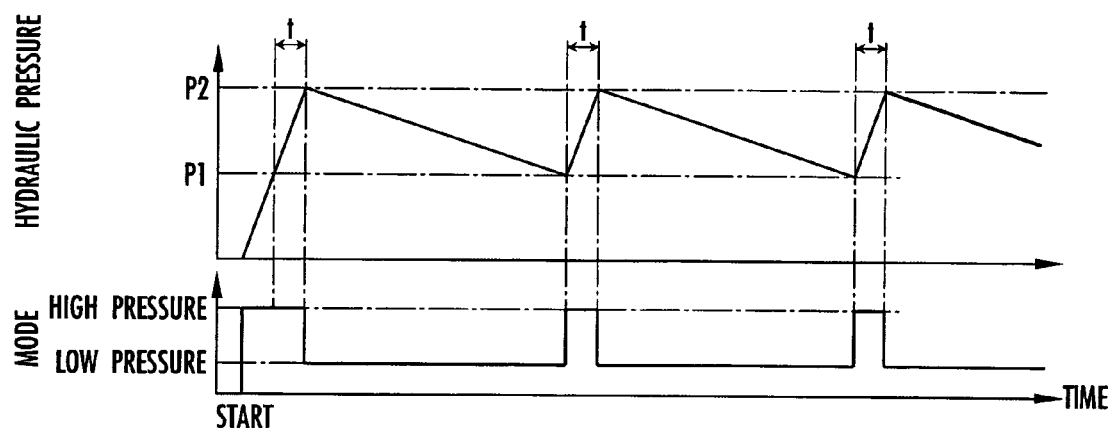
FIG. 6 is a timing chart showing a relation between a hydraulic pressure of an oil supply passage and a control mode for a setting pressure of the regulator valve during the hydraulic switching control in FIG. 5.

The controller 9 first determines whether or not the vehicle is starting in step S1. If so, it is determined whether or not the hydraulic switch 24 is off in step S2. When the vehicle is starting, the oil of the oil supply passage 14 has been leaked from the hydraulic clutch 6 and the valves inevitably until then and the hydraulic pressure of the oil supply passage 14 is substantially zero. Therefore, the hydraulic pump 10 is started in the condition where the hydraulic pressure of the oil supply passage 14 is lower than the first predetermined pressure P1, in other words, in the condition where the hydraulic switch 24 is off. Accordingly, the control progresses from the step S2 to step S9, in which the operation is switched to the high pressure mode. Thereby, as shown in FIG. 6, the hydraulic pressure of the oil supply passage 14 increases due to the oil supply from the regulator valve 11. Then, if the hydraulic pressure of the oil supply passage 14 increases to the first predetermined pressure P1 and thereby the hydraulic switch 24 is turned on, the control progresses to step S3 to determine whether or not predetermined time t has passed since the hydraulic switch 24 is turned on. During the period until the predetermined time t has passed, the control progresses to the step S9, in which the high pressure mode is maintained. After an elapse of the predetermined time t, the control progresses to step S10, in which the operation is switched to the low pressure mode.

After the vehicle starts, the control progresses to step S4 to determine whether or not a flag FG is set to "1." The flag FG is initially reset to "0," Therefore, the control progresses to step S5 to determine whether or not the hydraulic switch 24 is off. If the hydraulic switch 24 is on, the control progresses to step S10 to maintain the low pressure mode. On the other hand, if the hydraulic pressure of the oil supply passage 14 decreases to be lower than the first predetermined pressure P1 and thereby the hydraulic switch 24 is turned off, the control progresses to step S6 to determine whether or not the predetermined time t has passed since the hydraulic switch 24 is turned off. During the period until the predetermined time t has passed, the flag FG is set to "1" in step S7 and then the control progresses to the step S9, in which the operation is switched to the high pressure mode. Next time and after, the control progresses from the step S4 to step S6 directly. Therefore, even if the hydraulic pressure of the oil supply passage 14 becomes higher than or equal to the first predetermined pressure P1 due to the oil supply to the oil supply passage 14 in the high pressure mode and thereby the hydraulic switch 24 is turned on, the high pressure mode is maintained. After an elapse of the predetermined time t, the flag FG is reset to "0" in step S8. Thereafter, the control progresses to the step S10, in which the operation is switched to the low pressure mode. The low pressure mode is thus maintained until the hydraulic switch 24 is turned off again.

The predetermined time t to be a determination standard in the steps S3 and S6 is preset in line with a required period of time for increasing the hydraulic pressure of the oil supply passage 14 from the first predetermined pressure P1 to the second predetermined pressure P2. Therefore, the oil supply in the high pressure mode during the period of the predetermined time t increases the hydraulic pressure of the oil supply passage 14 to the second predetermined pressure P2 as shown in FIG. 6. As the hydraulic pressure monitoring means, it is possible to provide a second hydraulic switch as a hydraulic pressure monitoring means, which is turned on when the hydraulic pressure of the oil supply passage 14 becomes higher than or equal to the second predetermined pressure P2, in addition to the hydraulic switch 24. If the second hydraulic switch is determined to be on in the steps S3 and S6, the control progresses to the step S10 for switching to the low pressure mode. In addition, as in a third embodiment described later, it is also possible to provide a hydraulic sensor 24' for generating an output in proportion to the hydraulic pressure of the oil supply passage 14 as a hydraulic pressure monitoring means and to determine whether or not the hydraulic pressure of the oil supply passage 14 is lower than the first predetermined pressure P1 and is higher than the second predetermined pressure P2 on the basis of an output from the hydraulic sensor 24'.

In this regard, the second predetermined pressure P2 is preset to be higher than or equal to the accumulation end pressure AH as stated above and therefore the accumulator 16 becomes full due to the oil supply from the regulator valve 11. Therefore, it is possible to secure the time before the hydraulic pressure of the oil supply passage 14 decreases to a pressure lower than or equal to the first predetermined pressure P1 of the oil supply passage 14, in other words, the time during which the setting pressure of the regulator valve 11 is maintained at the low pressure PL. Furthermore, meanwhile the energy consumption is limited low even if the hydraulic pump 10 is driven for lubrication.

Figure 7:
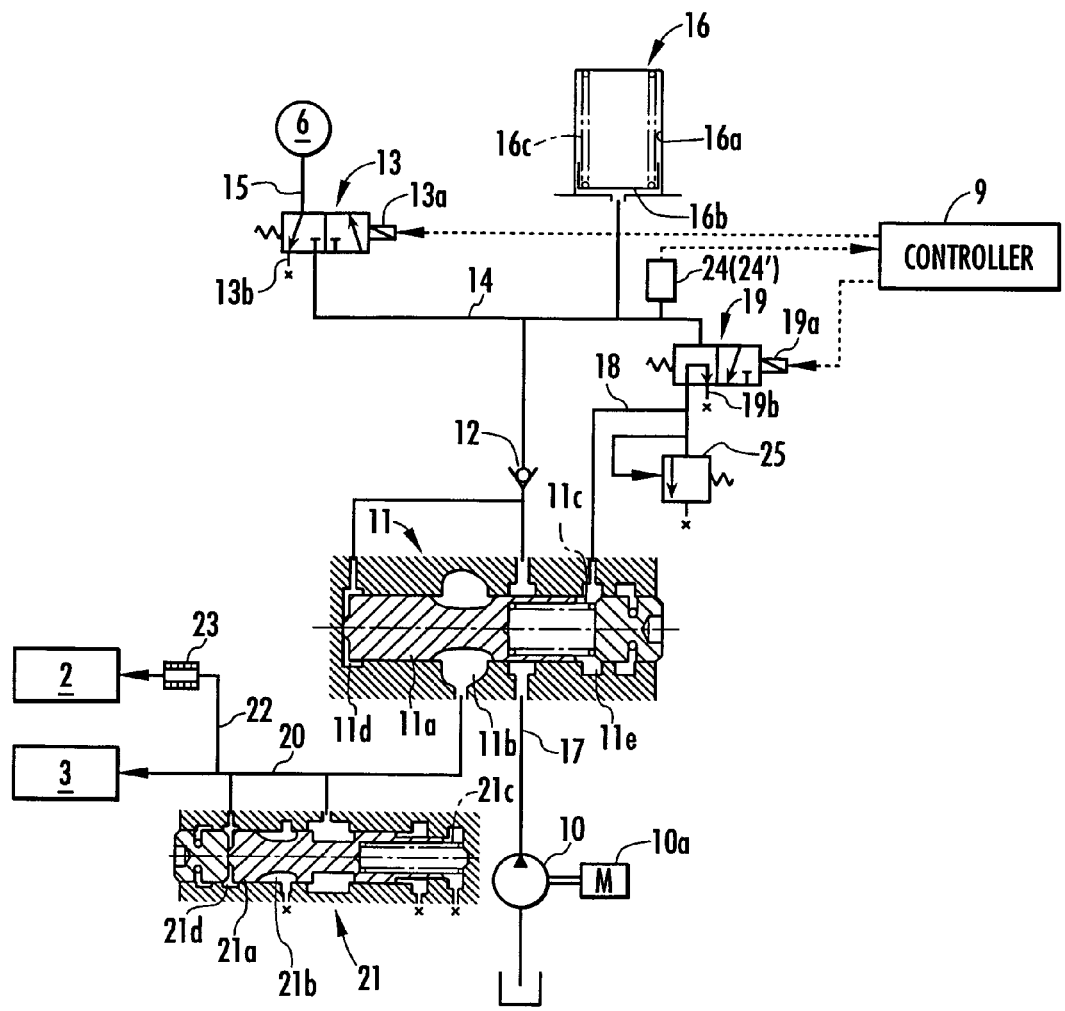
FIG. 7 is a diagram showing a hydraulic circuit for a hydraulic actuator according to a second embodiment of the present invention.

In the first embodiment, the spool 11a of the regulator valve 11 is formed in a stepped shape so that the pressure receiving area facing the oil chamber 11e is smaller than the pressure receiving area facing the oil chamber 11d, and thus it is difficult to process the spool 11a. To resolve this problem, the spool 11a may be formed in a shape not having a stepped portion as in a second embodiment shown in FIG. 7, so that the pressure receiving area facing the oil chamber 11e is equal to the pressure receiving area facing the oil chamber 11d. In this case, the pilot oil passage 18 is connected to a pressure reducing means such as, for example, a relief valve 25. Then, when the switching valve 19 connects the pilot oil passage 18 to the oil supply passage 14, the upper limit pressure of the hydraulic pressure input to the oil chamber 11e is limited to a relief setting pressure Pr of the relief valve 25. This causes the setting pressure PH for the high pressure of the regulator valve 11 to be Pr+F/s (PH=Pr+F/s), where F is a bias of the spring 11c and s is the pressure receiving area facing the oil chamber 11d or 11e. In this regard, the setting pressure PL for the low pressure is F/s.

In the above embodiment, the electric motor 2 is controlled so that its output torque is constant and thus the input torque to the power transmission mechanism 3 becomes constant, thereby achieving the constant lower limit pressure CL of the hydraulic pressure needed to secure the required torque transmission capacity of the hydraulic clutch 6. Therefore, there is no problem in uniquely setting the first predetermined pressure P1. On the other hand, if the electric motor 2 is controlled so as to vary in its output torque with the traveling condition and the output torque of the electric motor 2 (an input torque to the power transmission mechanism 3) is increased during high-load traveling such as, for example, when the vehicle goes up a hill on a punishing road or goes up a hill while taking in tow, the first predetermined pressure P1 uniquely set causes a problem described below.

Specifically, in this case, it is necessary to set the first predetermined pressure P1 so as to be higher than or equal to the lower limit pressure of the hydraulic pressure needed to secure the torque transmission capacity of the hydraulic clutch 6 corresponding to the maximum output torque of the electric motor 2. In this regard, by enlarging a friction plate of the hydraulic clutch 6 or increasing the number of the friction plates so as to secure a large torque transmission capacity at a low hydraulic pressure, the first predetermined pressure P1 can be set relatively low. This, however, increases the size of the hydraulic clutch 6. To avoid the increase in the size of the hydraulic clutch 6, the first predetermined pressure P1 have to be set considerably high. Therefore, the operation is switched to the high pressure mode in a stage where the hydraulic pressure of the oil supply passage 14 maintains a sufficient value to secure the torque transmission capacity corresponding to the motor torque during normal traveling in which the output torque of the electric motor 2 (hereinafter, referred to as a motor torque) is relatively low. Consequently, the frequency of switching to the high pressure mode becomes excessively high during normal traveling, thus obstructing the reduction of the energy consumption caused by driving the hydraulic pump 10.

Figure 8:
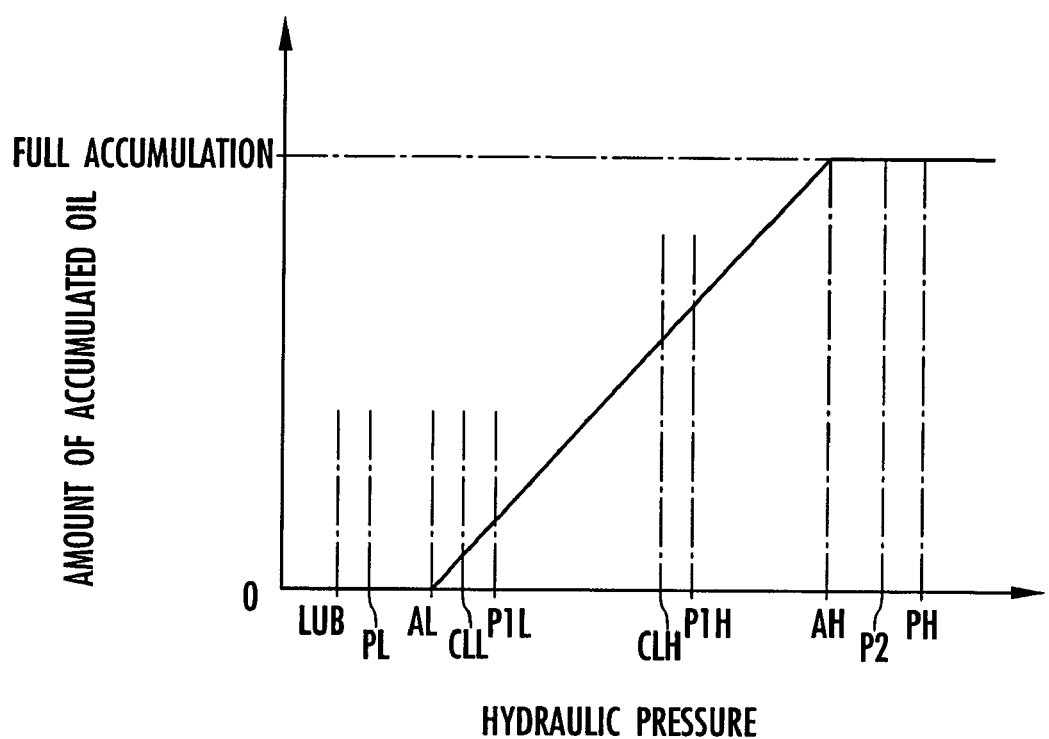
FIG. 8 is a graph showing a relation between a hydraulic pressure of an oil supply passage and an amount of accumulated oil in the accumulator and various hydraulic pressure values for use in a hydraulic pressure switching control shown in FIG. 9.

On the other hand, the first predetermined pressure P1 varying with the magnitude of the motor torque resolves the above problem. The following describes a third embodiment resolving the problem in this way. In the third embodiment, as shown in FIG. 8, the first predetermined pressure P1 has two values of a high pressure value P1H set slightly higher than the lower limit pressure CLH of the hydraulic pressure needed to secure the torque transmission capacity corresponding to the maximum value TMmax of the motor torque and a low pressure value P1L set slightly higher than the lower limit pressure CLL of the hydraulic pressure needed to secure the torque transmission capacity corresponding to a predetermined reference value TMB of the motor torque (TMB<TMmax). The first predetermined pressure P1 is switched between the high pressure value P1H and the low pressure value P1L according to the motor torque. As the hydraulic monitoring means, there is used the hydraulic sensor 24' generating an output proportional to the hydraulic pressure of the oil supply passage 14 (See FIGS. 2 and 7).

The switching control in the high pressure mode and the low pressure mode of the controller 9 in the third embodiment will be described hereinafter with reference to FIG. 9. First, it is determined whether or not the motor torque TM is higher than or equal to the reference value TMB in step S101. The motor torque TM varies based on an instruction from the controller 9 and therefore any detection means for the motor torque TM is not needed. If TM≧TMB, the control progresses to step S102 to switch the first predetermined pressure P1 to the high pressure value P1H. If TM<TMB, the control progresses to step S103 to switch the first predetermined pressure P1 to the low pressure value P1L.

Subsequently, the control progresses to step S104 to determine whether or not the flag FG is set to "1." If FG=0, the control progresses to step S105 to determine whether or not the detected hydraulic pressure P of the hydraulic sensor 24' (the hydraulic pressure of the oil supply passage 14) is higher than or equal to the first predetermined pressure P1. If P<P1, the control progresses to step S106 to determine whether or not the detected hydraulic pressure P of the hydraulic sensor 24' is higher than or equal to the second predetermined pressure P2. If P<P2, the flag FG is set to "1" in step S107 and then the control progresses to step S109 for switching to the high pressure mode. Next time and after, the control progresses from the step S104 directly to the step S106. Therefore, the high pressure mode is maintained even if the hydraulic pressure P of the oil supply passage 14 becomes higher than or equal to the first predetermined pressure P1 due to an oil supply to the oil supply passage 14 in the high pressure mode. If P≧P2, the flag FG is reset to "0" in step S108 and then the control progresses to step S110 for switching to the low pressure mode. Thereafter, the detected hydraulic pressure P of the hydraulic sensor 24' is maintained in the low pressure mode until it becomes lower than the first predetermined pressure P1.

Figure 9:
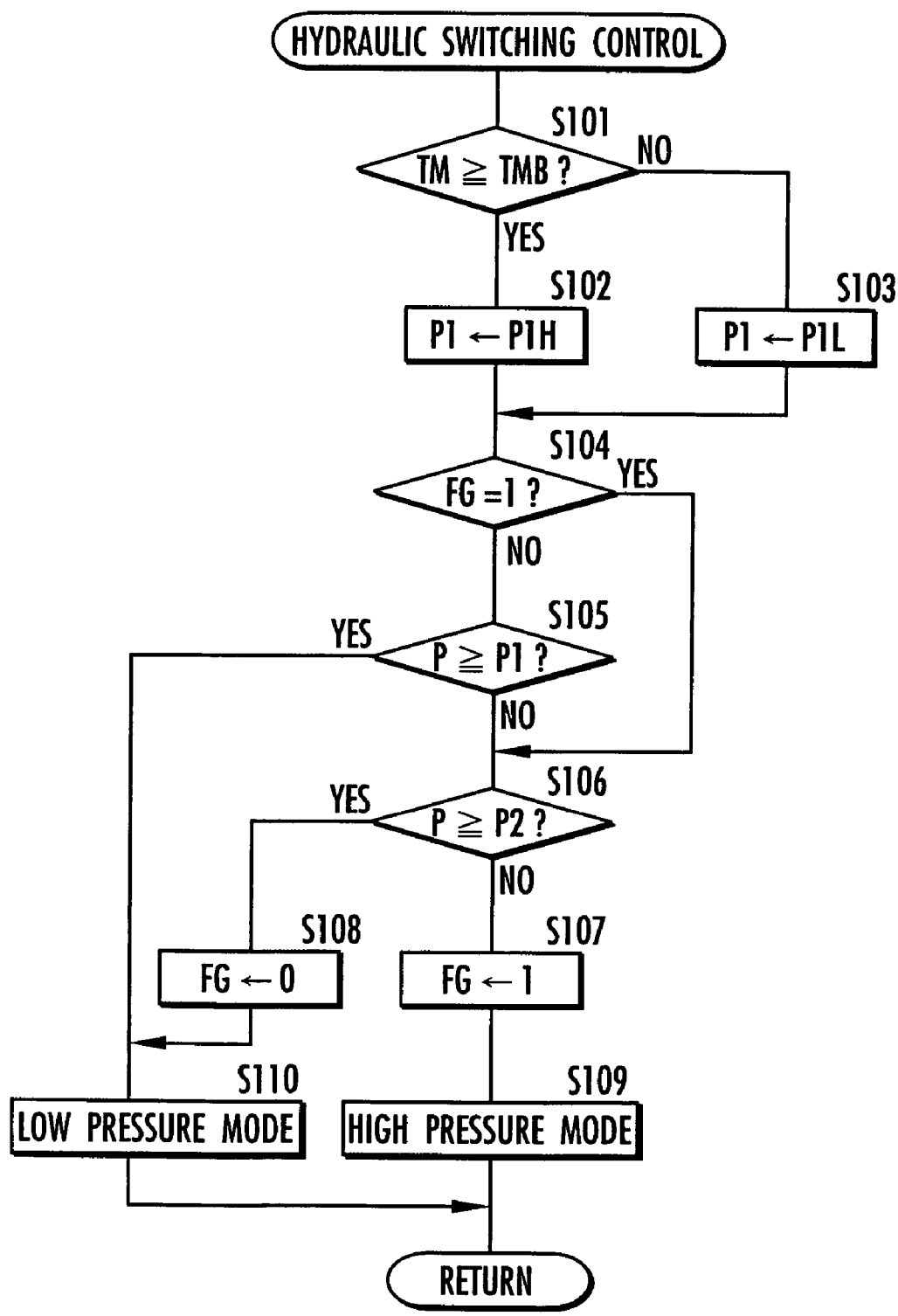
FIG. 9 is a flowchart showing a program of a hydraulic pressure switching control according to a third embodiment of the present invention.
Figure 10:
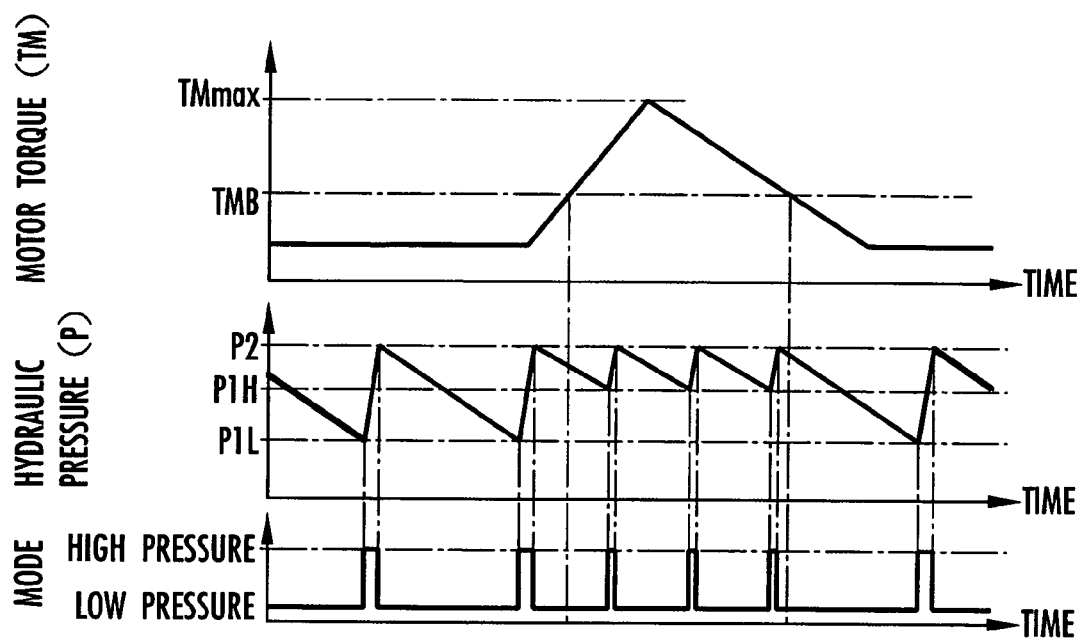
FIG. 10 is a timing chart showing a relation between a motor torque, a hydraulic pressure of an oil supply passage, and a control mode for a setting pressure of a regulator valve during the hydraulic switching control in FIG. 9.

Referring to FIG. 10, there is shown changes in the hydraulic pressure of the oil supply passage 14 and changes in the control mode of the setting pressure of the regulator valve 11 to changes of the motor torque TM when performing the switching control shown in FIG. 9. According to the switching control shown in FIG. 9, the first predetermined pressure P1 is switched to the high pressure value P1H during high-load traveling in which the motor torque TM is higher than or equal to the reference value TMB and therefore the hydraulic clutch 6 can transmit the high torque reliably. During the high-load traveling, however, the frequency in switching to the high pressure mode is high. On the other hand, during normal traveling in which the motor torque TM is lower than the reference value TMB, the first predetermined pressure P1 is switched to the low pressure value P1L and therefore the frequency in switching to the high pressure mode is low. Accordingly, the energy consumption caused by driving the hydraulic pump 10 can be reduced maximally while securing reliability of the torque transmission of the hydraulic clutch 6 during the high-load traveling.

Although the first predetermined value P1 is switched in two stages according to the motor torque TM in the third embodiment, it is also possible to switch the first predetermined value P1 in three or more stages according to the motor torque TM or to cause the first predetermined value P1 to vary continuously.

While the present invention has been described in connection with preferred embodiments in which the present invention is applied to the hydraulic controller for the hydraulic cluth 6, it is to be understood that the subject matter encompassed by the present invention is not limited to those specific embodiments. For example, if the power transmission mechanism is a planet gear mechanism and the planet gear mechanism is free to switch between on and off states of the power transmission by a hydraulic brake, the present invention is applicable to a hydraulic controller for the hydraulic brake similarly. Furthermore, if the second gear 4b can be freely connected or disconnected to or from the third gear 4c in the deceleration mechanism 4 shown in FIG. 1 by using a servo syncromesh mechanism whose switching operation is performed by a hydraulic cylinder, the present invention is applicable to a hydraulic controller for the hydraulic cylinder similarly. In the syncromesh mechanism, however, the torque transmission capacity does not vary with the hydraulic pressure of oil supplied to the hydraulic cylinder, unlike the hydraulic frictional engaging component such as the hydraulic clutch 6 or the hydraulic brake. Therefore, the hydraulic pressure of the oil supply passage 14 only need be maintained slightly higher than the lower limit pressure of the hydraulic pressure necessary for the switching operation of the syncromesh mechanism performed by the hydraulic cylinder. Thus, the foregoing hydraulic switching control in the third embodiment is unnecessary. In addition, the present invention is applicable to a hydraulic controller for a hydraulic actuator provided in a power transmission mechanism other than the power transmission mechanism for the auxiliary driving wheels of the vehicle.

What is claimed is:

1. A hydraulic controller for a hydraulic actuator incorporated into a power transmission mechanism for switching between on and off states of a power transmission, having a hydraulic circuit arranged to supply oil from a hydraulic pump to the hydraulic actuator via a regulator valve, a one-way valve, and a control valve for controlling an operation of the hydraulic actuator, the hydraulic circuit including an accumulator capable of accumulating a hydraulic pressure necessary for the operation of the hydraulic actuator, the accumulator being connected to an oil supply passage connecting the one-way valve and the control valve, and an oil passage for lubricating the power transmission mechanism connected to the regulator valve in the drain side thereof, the hydraulic controller comprising:

hydraulic pressure monitoring means for monitoring a hydraulic pressure of the oil supply passage;

hydraulic pressure switching means capable of freely switching a setting pressure of the regulator valve between a low pressure and a high pressure; and control means for controlling said hydraulic switching means so as to switch the setting pressure of the regulator valve between the low pressure and the high pressure according to the hydraulic pressure of the oil supply passage monitored by said hydraulic pressure monitoring means.

2. The hydraulic controller for the hydraulic actuator according to claim 1, wherein said control means switches the setting pressure of said regulator valve to the high pressure when the hydraulic pressure of said oil supply passage is lower than a first predetermined pressure and switches the setting pressure of said regulator valve to the low pressure when the hydraulic pressure of said oil supply passage is higher than or equal to a second predetermined pressure set higher than the first predetermined pressure.

3. The hydraulic controller for the hydraulic actuator according to claim 2, wherein the setting pressure for the low pressure of said regulator valve is higher than or equal to a setting pressure of a second regulator valve disposed on the lubricating oil passage and lower than the first predetermined pressure.

4. The hydraulic controller for the hydraulic actuator according to claim 2, wherein the first predetermined pressure is set higher than or equal to an accumulation start pressure at which said accumulator starts the accumulation.

5. The hydraulic controller for the hydraulic actuator according to claim 4, wherein said hydraulic actuator comprises a hydraulic frictional engaging component and the accumulation start pressure is set lower than the lower limit pressure of the hydraulic pressure, which secures a required torque transmission capacity of the hydraulic frictional engaging component, and wherein the first predetermined pressure is set higher than or equal to the lower limit pressure.

6. The hydraulic controller for the hydraulic actuator according to claim 2, wherein said control means maintains the setting pressure of said regulator valve at the high pressure for a predetermined period of time set in line with a period of time necessary for increasing the hydraulic pressure of the oil supply passage so as to be higher than or equal to the second predetermined pressure when said hydraulic pressure monitoring means detects that the hydraulic pressure of the oil supply passage becomes lower than the first predetermined pressure.

7. The hydraulic controller for the hydraulic actuator according to claim 2, wherein, if said hydraulic pump is actuated in the condition where said hydraulic pressure monitoring means detects that the hydraulic pressure of said oil supply passage is lower than the first predetermined pressure, said control means maintains the setting pressure of said regulator valve at the high pressure until the hydraulic pressure of the oil supply passage increases to the first predetermined pressure and since then is elapsed a predetermined period of time set in line with a period of time necessary for increasing the hydraulic pressure of the oil supply passage to the second predetermined pressure or higher.

8. The hydraulic controller for the hydraulic actuator according to claim 2, wherein said hydraulic actuator comprises a hydraulic frictional engaging component and a magnitude of an input torque to said power transmission mechanism varies and wherein the first predetermined pressure varies with the magnitude of the input torque.

9. The hydraulic controller for the hydraulic actuator according to claim 2, wherein the second predetermined pressure is set higher than or equal to an accumulation end pressure at which the accumulator is full.

* * * * *